United States Patent [19]

Chapman

[11] Patent Number: 5,730,450
[45] Date of Patent: Mar. 24, 1998

[54] PUSH/STEERING BAR FOR A CAMERA PEDESTAL

[75] Inventor: Leonard T. Chapman, North Hollywood, Calif.

[73] Assignee: Leonard Studio Equipment, Inc., North Hollywood, Calif.

[21] Appl. No.: 576,981

[22] Filed: Dec. 26, 1995

[51] Int. Cl.⁶ ........................................... B62B 3/00
[52] U.S. Cl. .................. 280/47.11; 280/47.371; 180/19.2
[58] Field of Search .............. 280/47.11, 47.34, 280/47.371, 99; 180/19.2, 19.3

[56] References Cited

U.S. PATENT DOCUMENTS

| | | | |
|---|---|---|---|
| 2,228,247 | 1/1941 | Cunningham | 280/47.11 |
| 2,388,692 | 11/1945 | House | 280/47.11 |
| 2,518,288 | 8/1950 | Coutant | 280/47.11 |
| 2,715,534 | 8/1955 | Hoge et al. | 280/47.11 |
| 2,751,030 | 6/1956 | Null | 180/19.2 |
| 2,950,121 | 8/1960 | Fisher | 280/47.11 |
| 3,820,811 | 6/1974 | Lapham | 280/99 |
| 4,095,250 | 6/1978 | Giglioli | 280/47.11 |
| 4,257,619 | 3/1981 | Fisher | 280/99 |
| 4,861,219 | 8/1989 | Mayle | 280/47.11 |
| 4,890,971 | 1/1990 | Heger | 180/19.2 |
| 4,950,126 | 8/1990 | Fabiano et al. | 280/47.11 |
| 5,259,471 | 11/1993 | Taylor et al. | 180/19.2 |
| 5,375,863 | 12/1994 | Chapman . | |
| 5,490,684 | 2/1996 | Chapman . | |

Primary Examiner—Brian L. Johnson
Assistant Examiner—Min Yu
Attorney, Agent, or Firm—Lyon & Lyon LLP

[57] ABSTRACT

A push/steering bar accessory for a camera pedestal has upper and lower elongate plates forming a straight bar. Sprockets within the bar are linked by a belt. The outer sprocket is joined to a tube for receiving the pushing/steering handle. The inner sprocket is attached to a kingpin on the pedestal. A positioning pin may be adjusted to change the angle of the bar relative to the pedestal. The pedestal accordingly may be pushed and steered from different positions on the side and behind the pedestal.

16 Claims, 9 Drawing Sheets

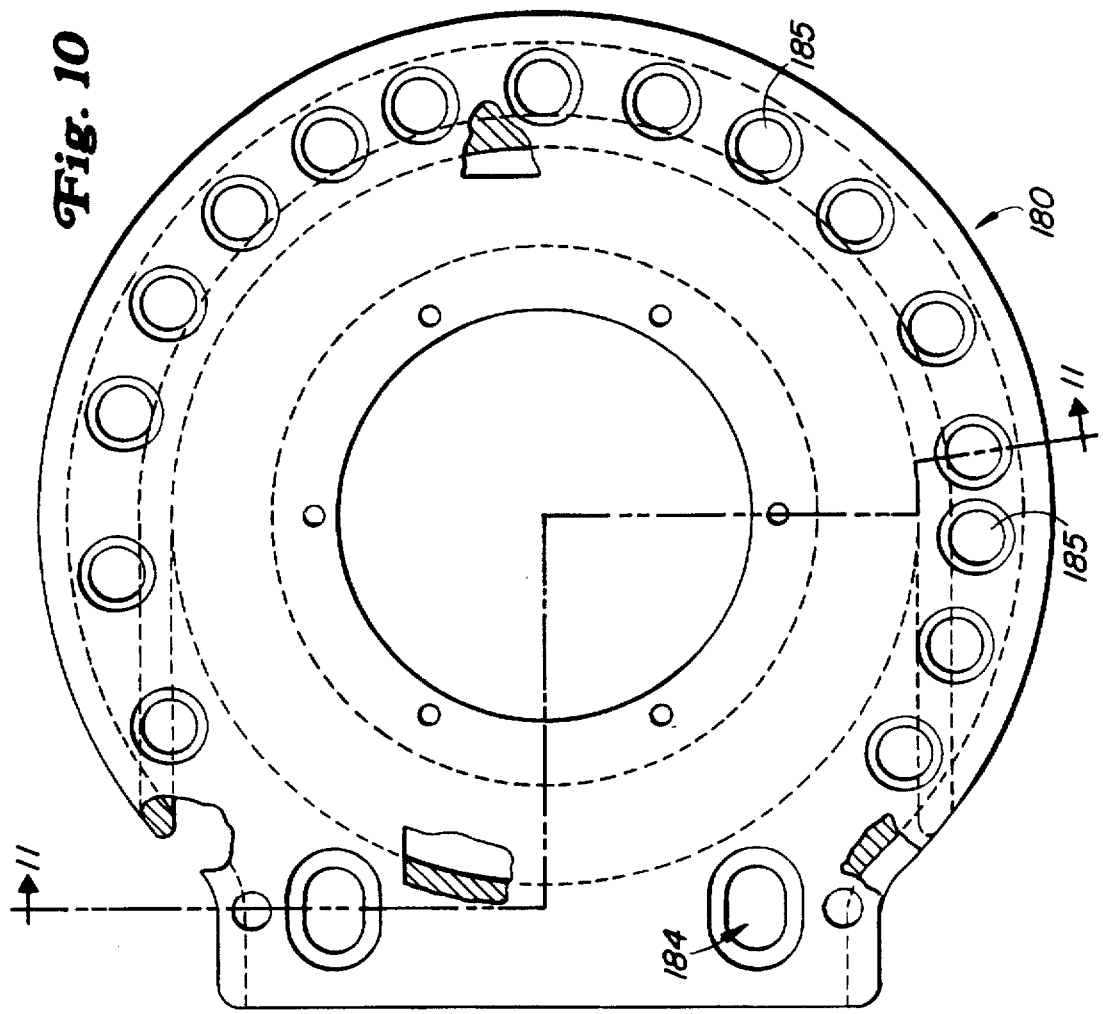
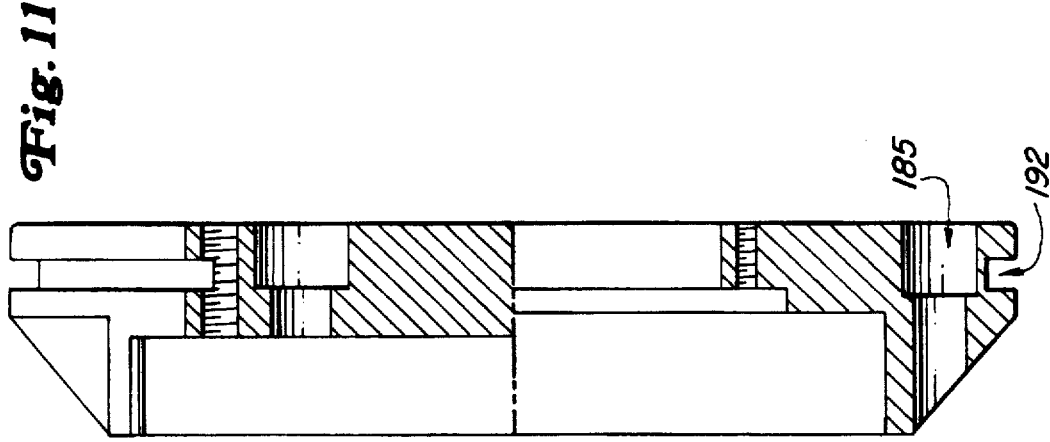

PUSH/STEERING BAR FOR A CAMERA PEDESTAL

BACKGROUND OF THE INVENTION

The field of the applications is camera dollies or pedestals used in the television and motion picture industries. In the production of television programs or motion pictures, it is often necessary to maneuver a camera between different filming positions. The required camera movement may include elevating and lowering the camera, as well as lateral and longitudinal movement between the camera and subject. Continuous translation of the camera, i.e., to follow an action or moving sequence is also occasionally called for. Camera pedestals and dollies are employed to support the camera and perform the desired camera movement.

My U.S. Pat. No. 5,375,863, issued Dec. 27, 1994, and U.S. Pat. No. 5,516,070, issued May 14, 1996 and U.S. Pat. No. 5,490,684, issued Feb. 13, 1996, each, incorporated by reference herein, disclose a camera pedestal or dolly having wheels on legs articulated to a chassis, and a steering system for steering the wheels. My U.S. Pat. No. 5,375,863, describes a push/steering bar for pushing and steering the camera pedestal. However, the push/steering bar disclosed therein is attached to both rear legs of the pedestal and is fixed in position.

In certain filming situations, it is advantageous for the camera dolly operator or "grip" to be able to push the dolly from one side, or at an oblique angle. For example, if the pedestal is rolling on track, the grip may prefer to walk on the ground, rather than on the track. In other situations, depending upon various pedestal loading and movement conditions, it is advantageous to be able to push and steer the pedestal from a side position. Existing push bars do not offer these advantages. Accordingly, there remains a need for an improved push/steering bar for a camera pedestal.

SUMMARY OF THE INVENTION

To these ends, an improved push/steering bar for a camera pedestal is a preferably single straight bar having sprockets at its ends. A tube at an outside end, attached to the first sprocket can be joined to a steering handle. The inner sprocket is quickly and easily attached a kingpin on the pedestal. The angle of the push bar relative to the pedestal may be changed by pivoting the push bar. Other and further objects will appear hereinafter.

BRIEF DESCRIPTION OF THE DRAWINGS

FIG. 10 is an enlarged plan view of the leg plate shown in FIG. 4; and

FIG. 11 is a section view taken along line 11—11 of FIG. 10.

DETAILED DESCRIPTION OF THE DRAWINGS

Figure 1:
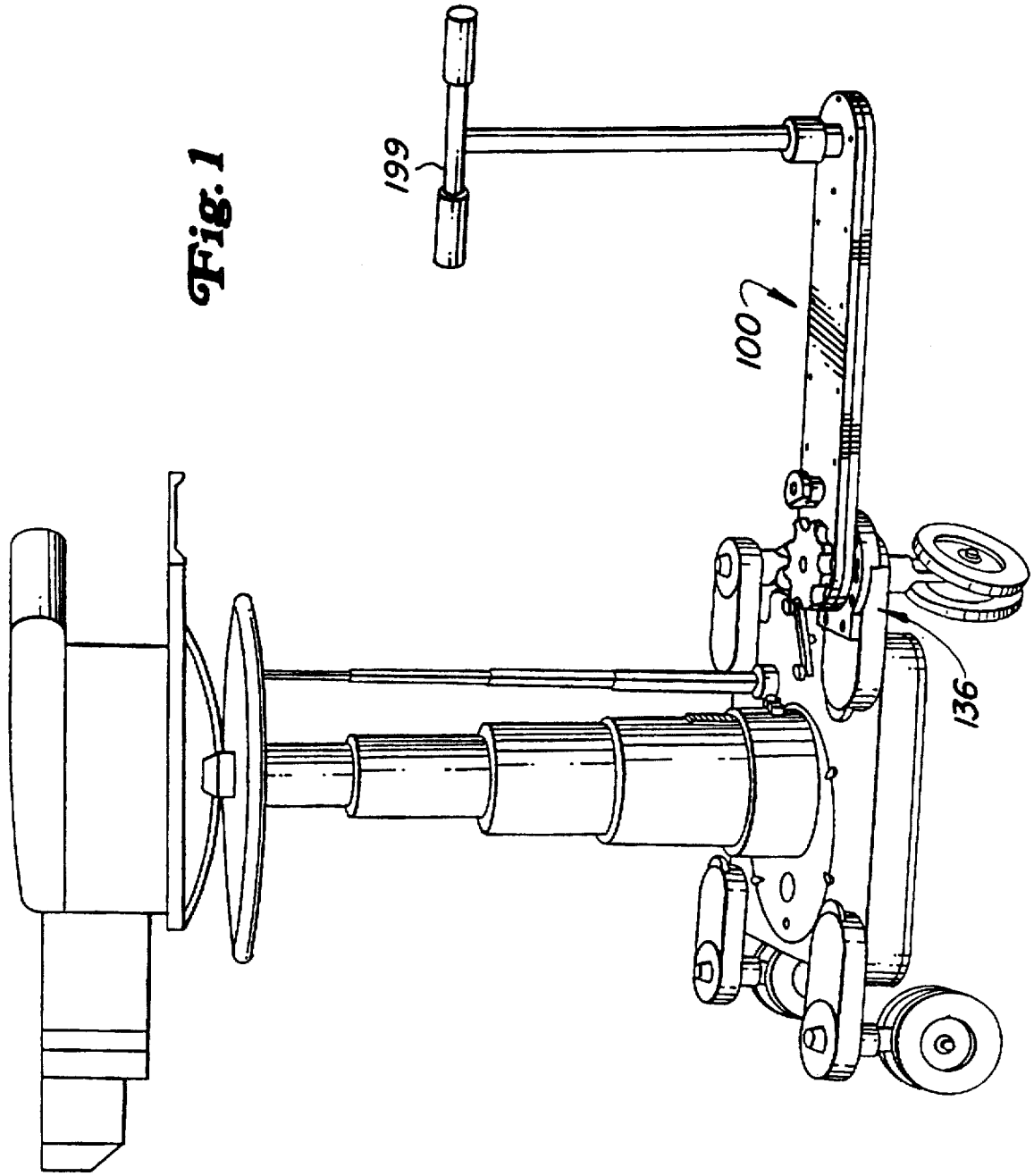
FIG. 1 is a perspective view of my new push/steering bar on a camera pedestal.
Figure 4:
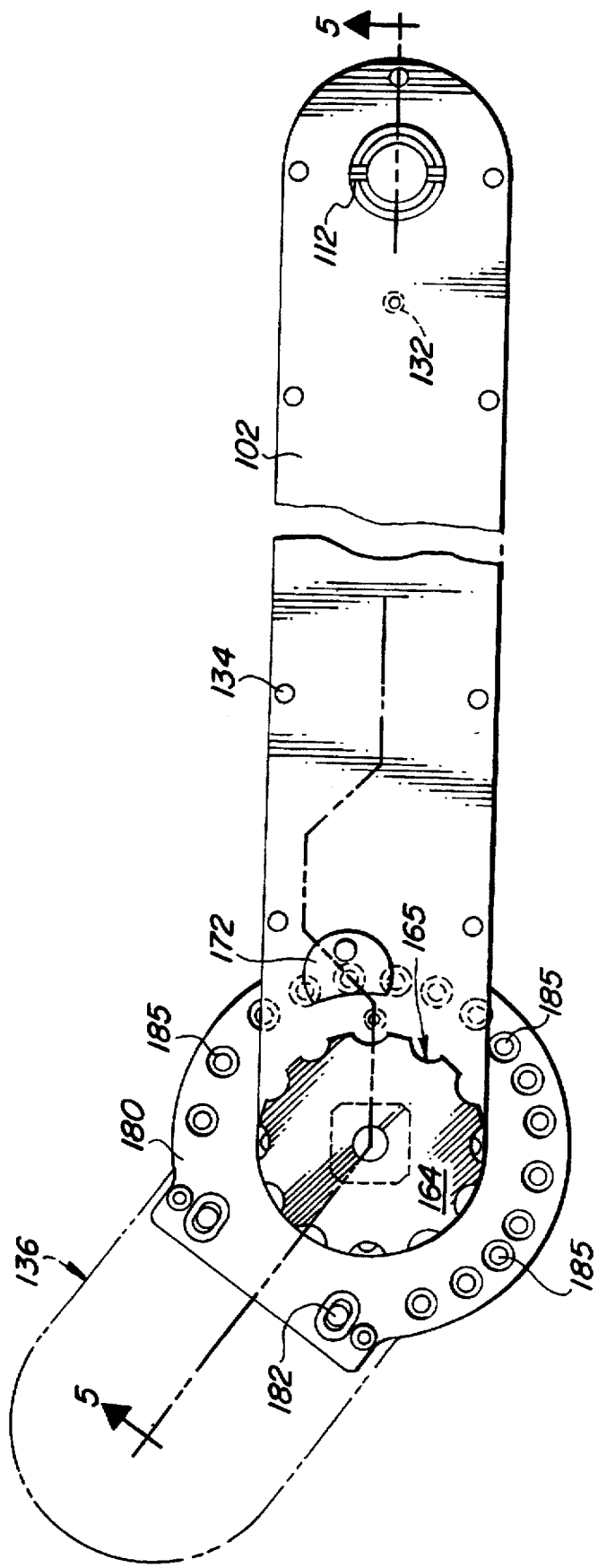
FIG. 4 is a plan view of the steering/push bar.
Figure 5:
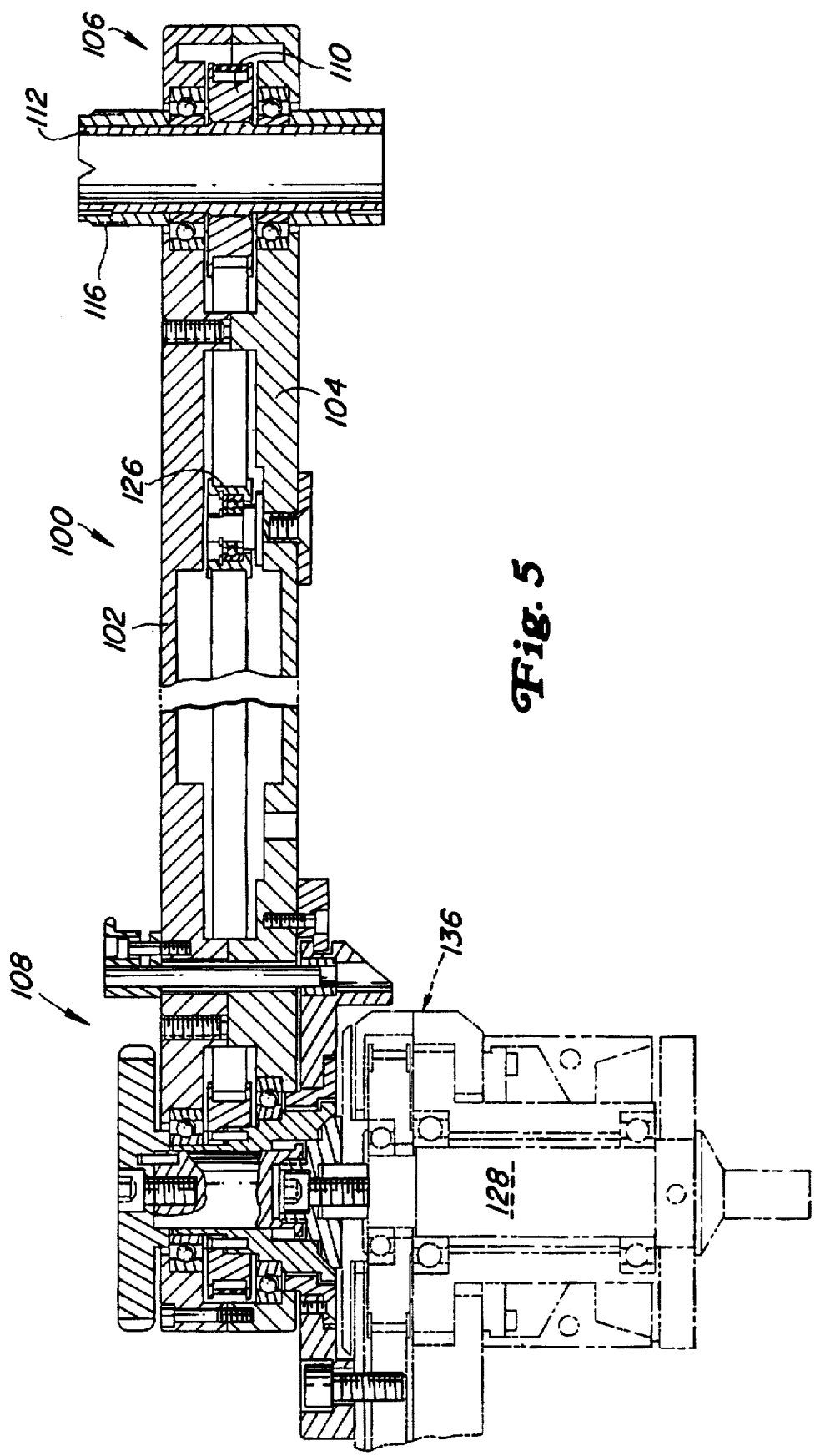
FIG. 5 is a section view taken along line 5—5 of FIG. 4.
Figure 6:
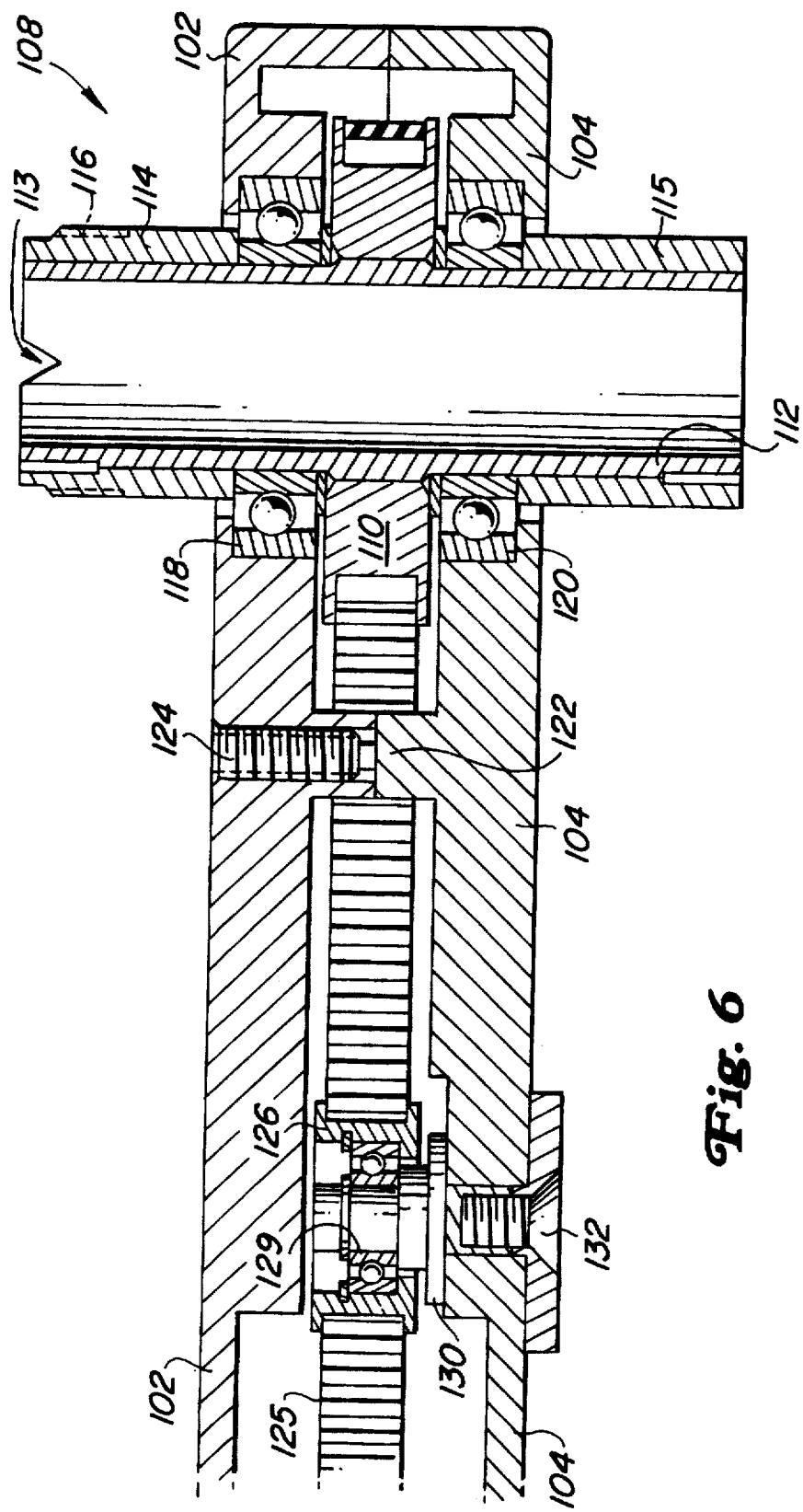
FIG. 6 is an enlarged view of the right side of FIG. 5.

Turning to FIGS. 1, 4 and 5, an alternative embodiment push/steering bar 100 has a top plate 102 and a bottom plate 104. At the outer end 106 of the push/steering bar 100 is an outer sprocket 110 joined (e.g. welded or pinned) to a tube 112. As best shown in FIG. 5, the tube 112 has notches 113. An upper collar 114 having a threaded section 116 is attached around, e.g., pressed onto, the upper end of the tube 112. Similarly, a lower collar 115 is attached to the lower end of the tube 112. The outer sprocket 110, upper collar 114 and lower collar 115, form an integral unit which is rotatably mounted between the top and bottom plates 102 and 104 on upper and lower bearings 118 and 120. The push/steering bar 100 is stiffened via a bolt 124 threading into a land 122.

An idler sprocket 126 is rotatably supported on an idler hub 130 by an idler bearing 129. The idler hub 130 is locked in position on the bottom plate 104 by a hub adjusting screw 132 which can shift in a slot in the bottom plate 104.

Figure 3:
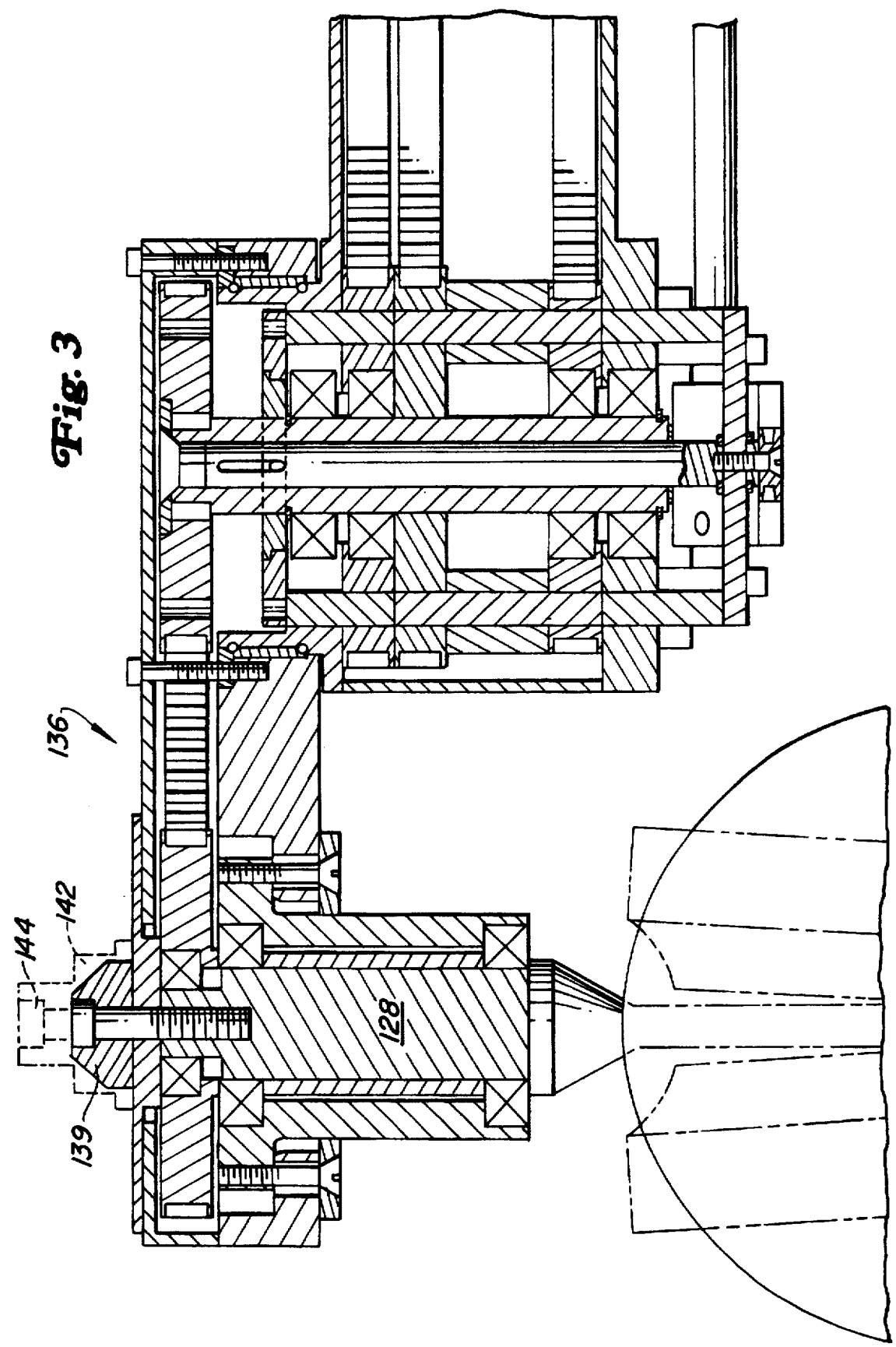
FIG. 3 is a section view of the rear left kingpin of the pedestal.

Referring to FIG. 3, the camera dolly is advantageously provided with a square cap 142 attached to the kingpin 128 at the rear left leg 115. The square cap 142 replaces cap 139, as shown in FIG. 3. A cap bolt 144 secures the square cap 142 into the top of the kingpin 128.

Figure 7:
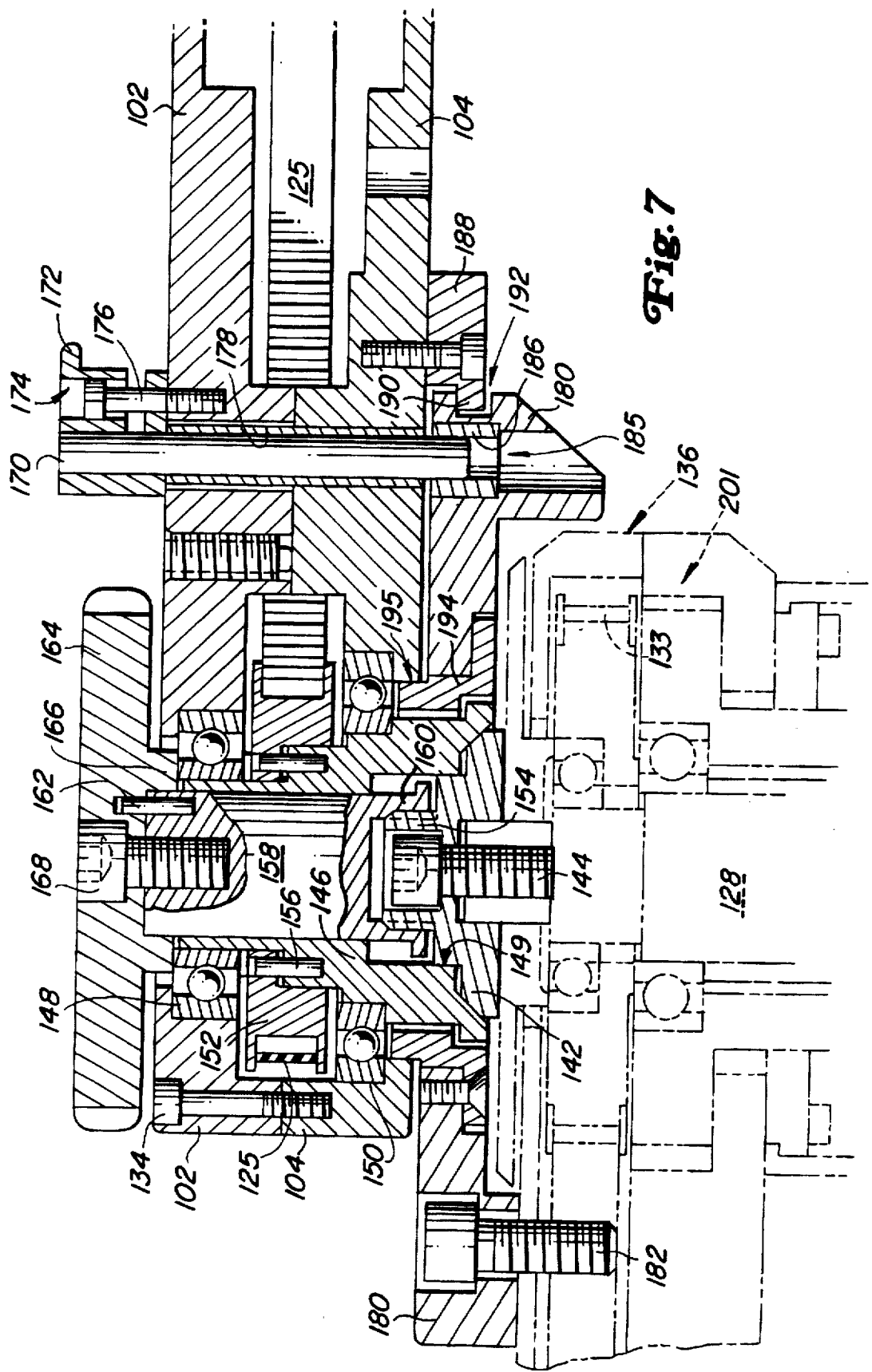
FIG. 7 is an enlarged view of the left side of FIG. 5.
Figure 9:
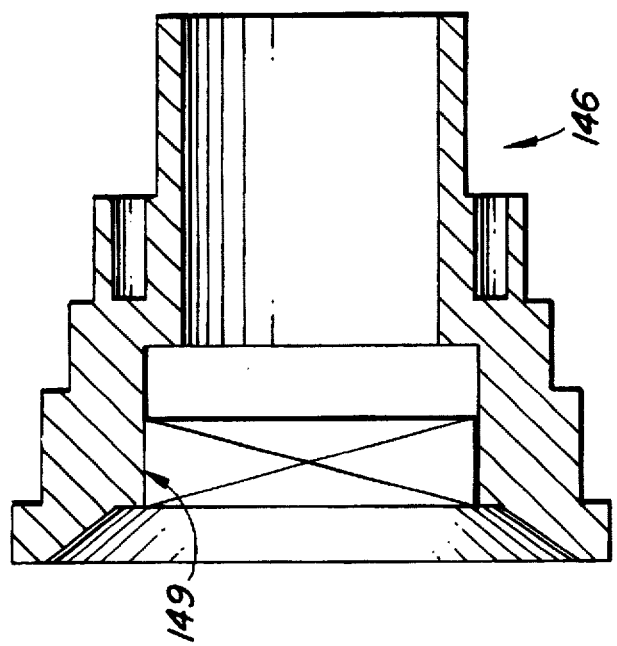
FIG. 9 is a section view thereof.
Figure 8:
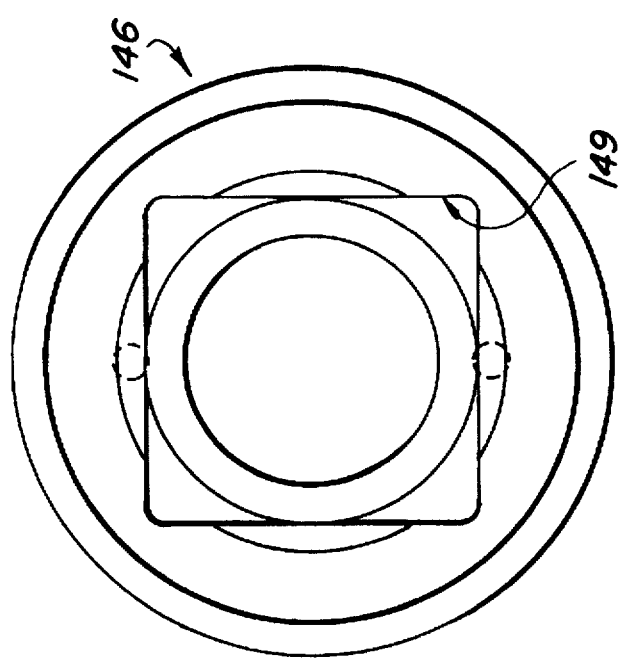
FIG. 8 is an end view of the cap receiver-shown in FIG. 6.

Referring to FIGS. 7, 8 and 9, a cap receiver 146 has a square recess 149 which fits over and mates with the square shoulder on the square cap 142. The cap receiver 146 is rotatably mounted within the push/steering bar 100 via an upper cap receiver bearing 148, and a lower cap receiver bearing 150. An inner sprocket 152 is attached (for example, pinned via sprocket pin 156) to the cap receiver 146. A leg plate spacer 194 is bolted to the leg plate 180. The cap receiver can rotate within the leg spacer plate 194 and the bar 100 can be pivoted around the outside of the spacer plate 194.

An axle 158 has an internally threaded lower end 160 which is screwed onto a threaded section 154 on the upper end of the square cap 142. The axle is rotatable within the cap receiver 146. A handle 164 having finger notches 165 (FIG. 4) has an annular shoulder 166. The handle 164 is secured to the axle 158 by a cap screw 168. A pin 162 prevents rotation between the handle 164 and axle 158.

Referring still to FIG. 7, a position pin handle 172 is joined to a position pin 170. A guide pin or screw 176 extending upwardly from the top plate 102 is slidably positioned within a guide bore 174 in the pin handle 172. A pin sleeve 178 is pressed into the top plate 102 and bottom plate 104, around the position pin 170.

Referring to FIGS. 7, 10 and 11, a leg plate 180 has a plurality of radially spaced apart bar positioning holes 185. An insert or bushing 186 is pressed into each of the bar positioning holes 185. As shown in FIGS. 1 and 7, the leg plate 180 is preferably secured to the top of the dolly leg 136 by leg plate bolts 182 threaded into the top of the dolly leg 136. The leg plate bolts 182 pass through slots 184 in the leg plate 180, to ease installation.

As shown in FIG. 7, a sector guide 188 having a lip 190 is bolted to the underside of the bottom plate 104. The lip 190 of the sector guide 188 is slidably positioned within a slot 192 in the leg plate 180. The lip limits the lifting/prying force which can be applied to the cap receiver and axle. If the bar 100 is inadvertently pushed up or down, the lip will move slightly to engage the upper or lower rim of the slot. Thus large loads or moments will be carried primarily by the sector plate and bolts 182, which are better positioned for such loads.

A toothed belt 125 is supported around the outer sprocket 110 and inner sprocket 152. Appropriate tension is set in the belt 125 via adjustment of the idler sprocket 126, by using the hub adjusting screw 132 (to move the idler sprocket 126 perpendicular to one side of the belt 125).

It is often advantageous to be able to push the dolly from various positions. For example, it may be preferable or necessary for the dolly grip to push the dolly forward from one side, for example, when the dolly is on track and the grip prefers not to walk on the track between the track rails, but rather to walk on the ground on one side of the track. In certain applications, it may be difficult or undesirable to push the dolly using the steering wheel 252 on the column. It is also convenient for a single dolly operator or grip to be able to both push and steer the dolly. It is preferred to push the pedestal with a force acting through the center of gravity of the pedestal and the load on the pedestal, to achieve smoother tracking. In crab mode, or when the pedestal is eccentrically loaded (e.g., with a camera operator standing on one side of the pedestal, pushing through the center of gravity is not readily achieved using a conventional push/steering bar. For some sequences, markings will be placed on the floor to indicate the proper pedestal positions and/or movements. The "grip" may want to push and steer from one side, to better view the floor markings. The present push/steering bar 100 may be used in such applications.

Figure 2:
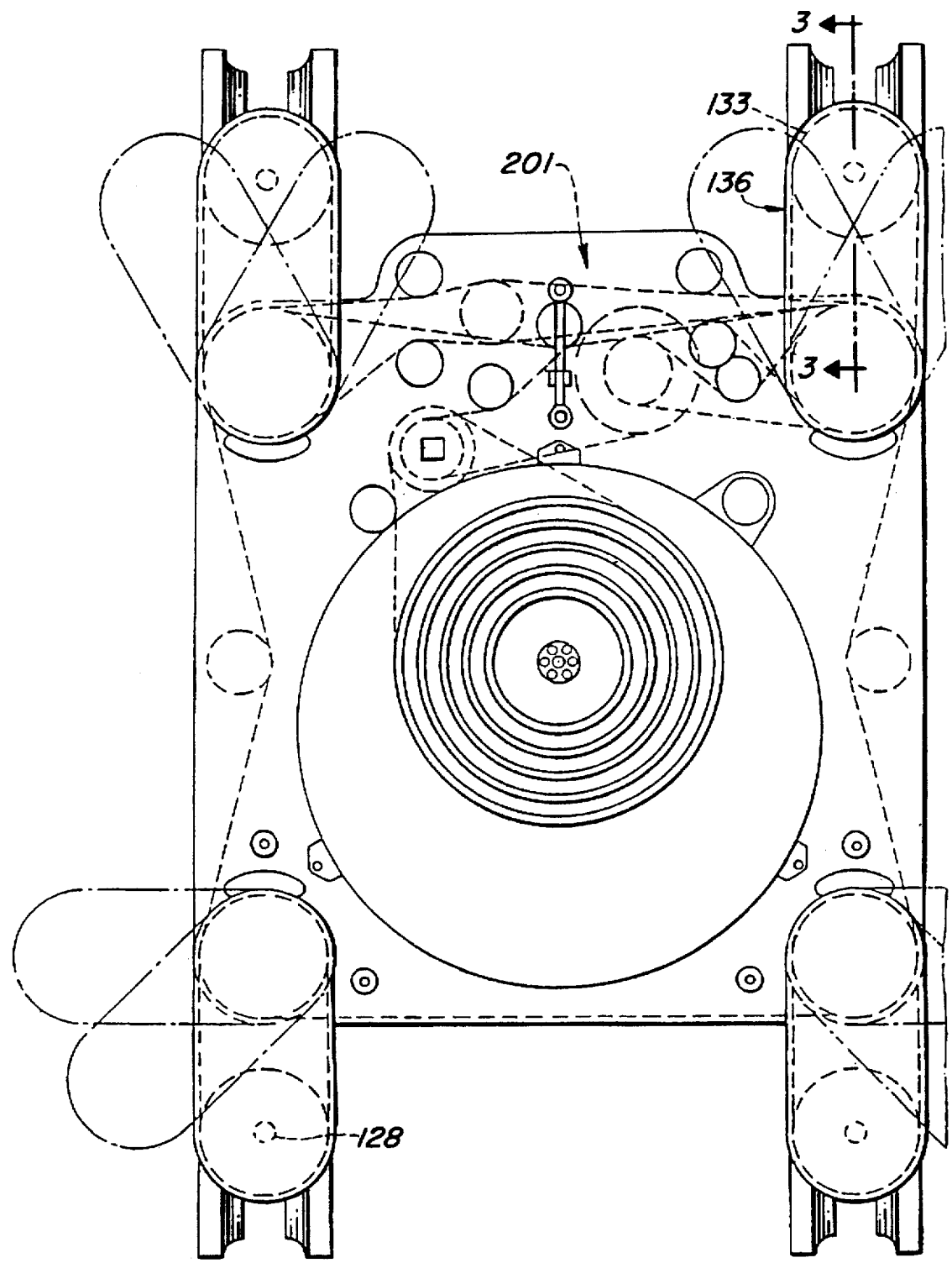
FIG. 2 is a plan view of the steering system of the pedestal.

In use, the dolly or pedestal shown in FIG. 1 is provided with a square cap 142 as shown in FIG. 7, and with threaded holes in the leg to receive the leg plate bolts 182. The dolly may otherwise be unchanged from the embodiments shown in my U.S. Pat. No. 5,375,863 for use with the push/steering bar 100. To install the push/steering bar 100, the cap receiver 146 at the inner end 108 is simply placed over the square shoulder of the square cap 142, with the square fittings engaging each other. The cap receiver 146 may be rotated slightly in either direction, by turning the handle 164, to align the square recess in the cap receiver with the square shoulder on the square cap 142. The handle is then turned (clockwise from the top) causing the threaded end 160 of the axle 158 to move down on the threaded upper end of the square cap 142. With the axle 158 thread engaged onto the square cap 142, the cap receiver 146 is locked into position on the square cap 142, and in turn to the kingpin 128, and as shown in FIG. 2, to the entire steering system 201 of the dolly. (In contrast, the "scissors" pushbar shown in my U.S. Pat. No. 5,375,863 can require more time to install, and is heavier.) The two leg plate bolts 182 are presently installed, although the push/steering bar 100 may be used with only the cap receiver. However, without the bolts 182, the leg plate 180 may rotate slightly as a turning force or moment is applied to the push/steering bar.

At the outer end 106 of the push/steering bar 100, a T-shaped steering handle 199 is engaged onto the tube 112, with tabs on the T-handle engaging the notches 113 on the tube 112, (as shown in FIGS. 29 and 30 of my U.S. Pat. No. 5,375,863). A threaded collar on the handle is turned onto the threaded section 116 of the upper collar 114. The T-handle 199 is then engaged to the dolly steering system 201. The dolly may be pushed by pushing on the T-handle with the pushing forces transmitted by the push/steering bar 100 to the rear left leg of the dolly, and then to the entire dolly itself.

The angle of the push/steering bar 100 relative to the rear leg 114 may be adjusted by lifting the position pin 170 out of its bar positioning hole 185 and pivoting the push/steering bar 100 to the desired angle and then re-installing the position pin 170 in another bar positioning hole 185. As shown in FIG. 10, several bar positioning holes 185 are provided, to provide a broad range of available angles. The sleeves or inserts 178 and 186 (preferably steel) resist galling and wear in the (preferably aluminum) positioning holes 185.

In use, as the T-handle 199 is turned, it in turn drives the outer sprocket 110, correspondingly driving the belt 125 and inner sprocket 152. The inner sprocket 152 is joined to the cap receiver 146, which is linked to the square cap 142 and to the kingpin 128 and to the kingpin sprocket 133 in the dolly leg 136. The sprocket 133 in the dolly leg 136 is in turn linked to the entire steering system 201 of the dolly, as shown in FIG. 2 and described above.

Thus, while a single embodiment has been shown and described, various modifications may be made without departing from the spirit and scope of the invention. For example, various equivalents to the elements shown may be used, including different kinds of belts, chains, sprockets, attachment means etc. Thus, the invention should not be restricted, except by the following claims.

I claim:

1. An accessory that can be added and removed as needed adapted for pushing and steering a camera pedestal, comprising:
   - a push bar having a first sprocket and a second sprocket connected by one of a belt and a chain;
   - a first fitting for receiving a handle, attached to the first sprocket;
   - a second fitting linked to the second sprocket for engaging a kingpin on the pedestal; and
   - means for irrotatably attaching one end of the push bar to the camera pedestal.

2. The accessory of claim 1 further comprising an elongate top plate and bottom plate containing the sprockets and belt.

3. The accessory of claim 1 wherein the kingpin has a cap and the second fitting has a recess adapted to engage the cap.

4. The accessory of claim 3 wherein a cap receiver is fixed to the second sprocket.

5. The accessory of claim 1 further comprising an idler sprocket engaging the belt.

6. The accessory of claim 1 further comprising a T-shaped handle attached to the first sprocket.

7. In a pedestal for supporting a motion picture or television camera, having a steering system for simultaneously steering all wheels of the pedestal in the same direction, the improvement comprising:
   - a push/steering accessory that can be added and removed as needed having
     - a housing;
     - a first sprocket and a second sprocket rotatably mounted in the housing;
     - a belt connecting the first and second sprockets;
     - a handle attached to the first sprocket; and
     - a fitting for linking the second sprocket to the steering system in the pedestal.

8. A pedestal for supporting a camera comprising:
   - a chassis;
   - legs pivotably attached to the chassis;
   - a kingpin within each leg;
   - a wheel attached to each kingpin; and
   - a push/steering bar including:
     - a housing;
     - a first sprocket and a second sprocket rotatably supported in the housing;

a belt connecting the first and second sprocket;
a handle linked to the first sprocket; and
a fitting linking the second sprocket to the kingpin of one of the legs.

9. An accessory that can be added and removed as needed adapted for pushing and steering a camera pedestal comprising:
   a push bar having a first sprocket and a second sprocket connected by one of a belt and chain;
   a first fitting for receiving a handle, attached to the first sprocket;
   a second fitting attached to the second sprocket for linking to a kingpin on the pedestal; and
   a leg plate having a sector plate, and a position pin on the accessory engageable into spaced apart holes in the sector plate.

10. An accessory that can be added and removed as needed for attachment to a camera pedestal, comprising:
    a push bar having a first sprocket and a second sprocket connected by one of a belt and a chain;
    a first fitting attached to the first sprocket;
    a second fitting attached to the second sprocket for connecting to a kingpin on the pedestal; and
    a handle attached to a threaded axle co-axial with the kingpin when attached.

11. An accessory that can be added and removed as needed for attachment to a camera pedestal, comprising:
    a push bar having a first sprocket and a second sprocket connected by one of a belt and a chain;
    a first fitting linked to the first sprocket;
    a second fitting linked to the second sprocket;
    an elongate top plate and bottom plate containing the sprockets and belt; and
    a sector guide attached to the bottom plate and having a lip extending into a slot on a leg plate for attachment to the pedestal.

12. An accessory that can be added and removed as needed for attachment to a camera pedestal, comprising:
    a push bar having a first sprocket and a second sprocket connected by one of a belt and a chain;
    a first fitting attached to the first sprocket;
    a second fitting linked to the second sprocket for connecting to a kingpin on the pedestal;
    the kingpin having a cap and the second fitting having a recess adapted to engage the cap;
    a cap receiver having a recess adapted to irrotatably engage the cap; and
    bearings attached to the cap receiver.

13. An accessory that can be added and removed as needed for attachment to a camera pedestal, comprising:
    a push bar having a first sprocket and a second sprocket connected by one of a belt and a chain;
    a first fitting linked to the first sprocket;
    a second fitting linked to the second sprocket for connecting to a kingpin on the pedestal; and
    a square cap attached to the kingpin and a square cap receiver attached to the second fitting.

14. An accessory that can be added and removed as needed for attachment to a camera pedestal, comprising:
    a bar having a first end and a second end;
    a first sprocket and a second sprocket rotatably attached to the bar;
    a belt or a chain linking the first sprocket and the second sprocket;
    a first fitting linked to the first sprocket; and
    a second fitting linked to the second sprocket; and
    means for irrotatably attaching the first end to the camera pedestal.

15. A camera pedestal comprising:
    a chassis;
    a steering system in the chassis, the steering system including a kingpin;
    a push bar that can be added and removed as needed attachable to the chassis;
    first and second sprockets rotatably attached to the push bar;
    a chain or belt extending around the first and second sprockets;
    a first fitting connected to the first sprocket and adapted to receive a handle;
    a second fitting connected to the second sprocket and adapted to receive the kingpin; and
    means for locking the push bar into different angular positions with respect to the chassis.

16. The camera pedestal of claim 15 wherein the means for locking comprises a leg plate having a plurality of radially spaced apart bar positioning holes, and a positioning pin extendable into the positioning holes.

* * * * *